United States Patent [19]
Bertling et al.

[11] 3,812,647
[45] May 28, 1974

[54] APPARATUS FOR STACKING AND PACKAGING FOOD PRODUCTS

[75] Inventors: Rudolph B. Bertling, New Albany, Ind.; Edward R. Kerr, Minneapolis, Minn.

[73] Assignee: The Pillsbury Company, Minneapolis, Minn.

[22] Filed: Nov. 29, 1972

[21] Appl. No.: 310,291

[52] U.S. Cl............................. 53/62, 53/159, 53/252, 198/35, 214/6 D
[51] Int. Cl............................................. B65b 57/20
[58] Field of Search .......... 53/62, 159, 252; 198/35; 214/6 D

[56] References Cited
UNITED STATES PATENTS

| | | | |
|---|---|---|---|
| 2,631,767 | 3/1953 | Banks ............................... | 53/252 X |
| 2,934,869 | 5/1960 | Engleson et al. ................. | 53/252 X |
| 3,393,645 | 7/1968 | Mason .............................. | 53/159 X |
| 3,525,443 | 8/1970 | Pomara ............................. | 214/6 D X |
| 3,670,474 | 6/1972 | Vieson et al. ..................... | 53/62 X |
| 3,719,019 | 3/1973 | Albrecht et al. ................... | 53/159 |

*Primary Examiner*—Travis S. McGehee
*Attorney, Agent, or Firm*—James V. Harmon; Ronald E. Lund; Michael D. Ellwein

[57] ABSTRACT

Flat, disc-shaped food products are packaged by first transferring the products from a continuously moving belt conveyor to a group of continuously moving endless spreading conveyors of a smaller width which carry the articles generally in the same direction but are oriented relative to one another in a fan arrangement to spread out the rows of articles laterally. At the ends of the spreading conveyors the pieces drop onto an accumulator table which allows six pieces to be stacked one on top of another. The stack is indexed onto a constant speed turntable which moves the entire stack of six to a predetermined holding station for loading onto a horizontally disposeed bucket conveyor. When one of the buckets comes into alignment with the stack, suitable sensing and actuating means causes the stack to be transferred into the bucket. The bucket conveyor motion is continuous. The buckets, therefore, move sequentially past the turntable loading stations. As each bucket passes the loading station, material is transferred to the bucket only if empty and only if the stack is present in the loading position. Once loaded in the bucket conveyor, the stack is transferred to a carton loading location where an extendable pusher arm engages the stack in the bucket and transfers it to a carton positioned in alignment with the bucket. The carton is then closed and sealed conventionally.

6 Claims, 7 Drawing Figures

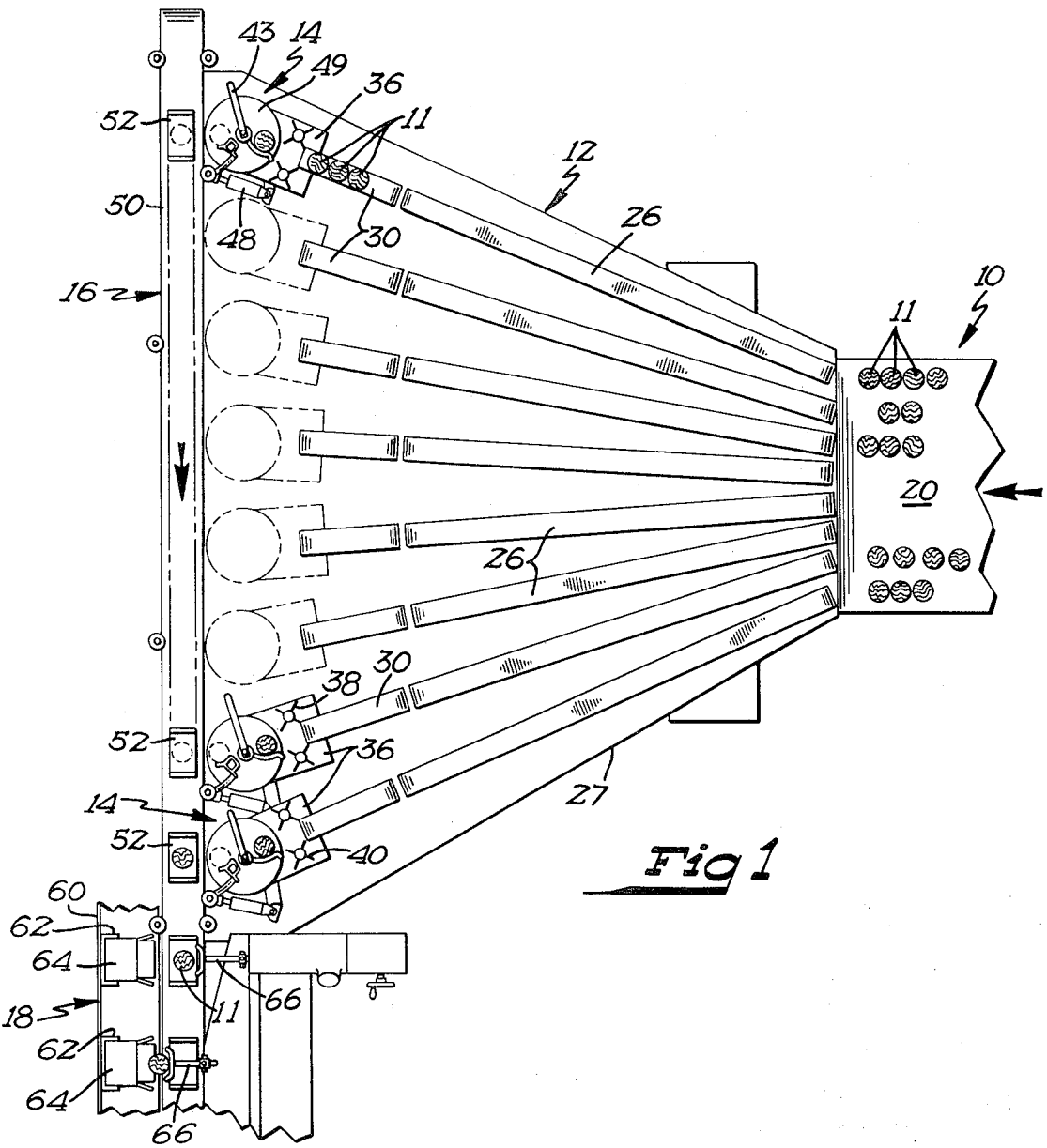
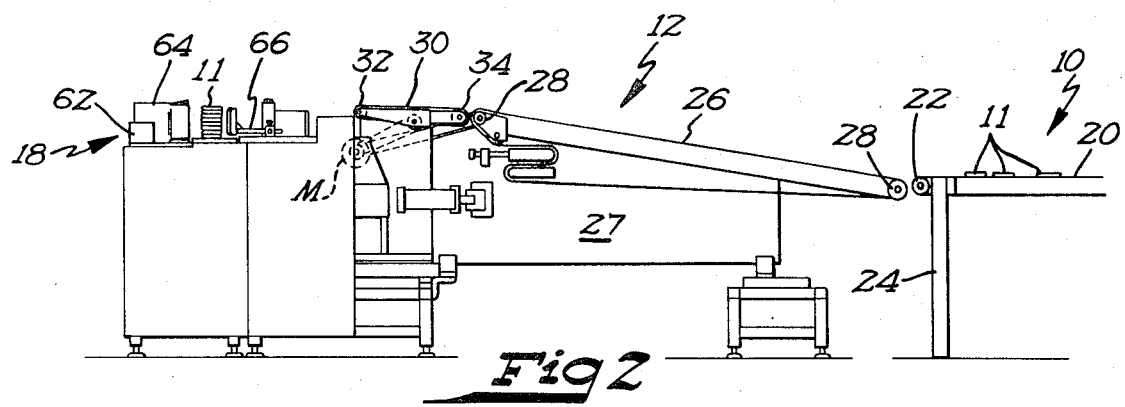

APPARATUS FOR STACKING AND PACKAGING FOOD PRODUCTS

FIELD OF THE INVENTION

The present invention relates to packaging equipment and more particularly to equipment for stacking flat food products and inserting them in containers.

THE PRIOR ART

While a variety of packaging machines have been designed for inserting articles into containers, most are unsuited for use in connection with packaging of relatively delicate objects such as cookies, cakes, turnovers, toaster foods and the like which have a tender or delicate structure that is likely to become broken or damaged during the packaging process. Other machines of the type described are relatively slow acting, require constant attention by operators or are otherwise inefficient in operation and subject to malfunction.

THE OBJECTS

In view of the defects of the prior art it is a primary object of the invention to provide an apparatus of the type described having the following capabilities and general characteristics: a) the ability to transfer a plurality of moving articles received from an oven or other preparing equipment and arranged in rows and columns upon a conveyor to a plurality of stacking locations which accumulate an established number of objects for each package, b) a provision for transferring stacked objects to a holding location and for moving them reliably from the holding location to the empty bucket of a conveyor moving continuously past the hold location, c) provision for sensing the number of articles present in the hold location, sensing the condition of the bucket and the proper location of the bucket to receive the articles and for transferring the articles only when predetermined suitable conditions exist, d) provision for reliably inserting stacked products into a package without disturbing the stack or damaging the products.

SUMMARY OF THE INVENTION

Briefly, the invention provides a packaging apparatus which includes a conveyor for feeding a plurality of food articles in succession to an accumulation location where each one lands upon the article which precedes it so as to form a stack of the articles. The stack is then transferred to a bucket conveyor which includes a plurality of buckets that serve to carry each stack to a point at which each stack is loaded into a carton. This is accomplished by locating each carton adjacent one of the buckets and in alignment with the bucket. An extensible loading arm is adapted to engage the stack and press the stack from the bucket into the carton to thereby fill the carton.

Another aspect of the invention is to provide a plurality of spreading conveyors in a fan shaped arrangement with the closely spaced ends positioned adjacent to a feed conveyor upon which the articles are arranged in an array made up of columns and rows at right angles to one another. The inlet side of each spreading conveyor receives one column of the articles and advances the column to the accumulator. From the accumulator the articles are moved to a loading station where they are transferred to the bucket conveyor.

The invention is especially useful for packaging flat, disc-shaped food products which are arranged in a two dimensional array made up of columns and rows resting on a belt conveyor. In this application, a plurality of continuously moving endless spreading conveyors of a smaller width receive the articles from the first conveyor. The pieces drop from the end of each spreading conveyor onto an accumulator table which allows several pieces to be stacked one on top of another. The pieces then are pushed onto a constant speed turntable which conveys the entire stack to a loading station from which the stack can be transferred onto a bucket conveyor. When one of the buckets comes into alignment with the stack, a suitable sensing and actuating means causes the stack to be transferred into the bucket. The bucket conveyor then moves the stack to a carton loading location where an extendable pusher arm engages each stack and transfers it into a carton positioned in alignment with the bucket.

THE FIGURES

FIG. 1 is a partial plan view of the invention.
FIG. 2 is a side elevational view of the invention.
FIG. 3 is a perspective view of an accumulator and bucket loader.
FIG. 4 is a side elevational view of the conveyor bucket loader.
FIG. 5 is a wiring diagram of the bucket loader.
FIG. 6 is a plan view of the carton loader, and
FIG. 7 is a diagramatic plan view of the drive for the accumulator transfer device with a platform partly broken away.

DESCRIPTION OF THE PREFERRED EMBODIMENT

Figure 3:
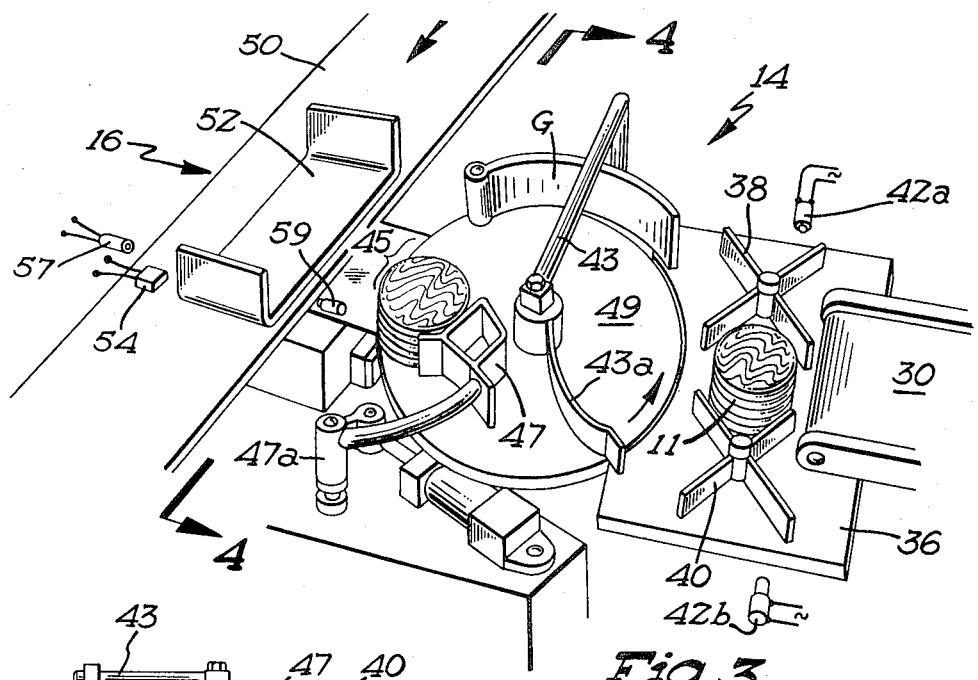

The major components of the apparatus will be described first with reference particularly to FIGS. 1, 2 and 3. As best seen in FIG. 1, the food products being packaged are generally disc-shaped somewhat like cookies. The invention can, however, be applied to products of a great diversity of shapes provided they are capable of being stacked one upon the other. The products 11 are arranged in columns and rows on a continuously moving belt conveyor 10 which moves them toward the inlet end of a plurality of spreading conveyors placed in a fan shaped arrangement with the ends which are closest together adjacent to the conveyor 10. Each of the spreading conveyors transports articles to an accumulator table designated 36. When a predetermined number is present in a stack on the table 36, an accumulator emptying assembly including star wheels 38 and 40 transports the stack to a loading station designated 45 where at the appropriate moment an arm 47 moves the entire stack onto a bucket conveyor including buckets 52 which travel continuously toward the view or as seen in FIG. 1. When a bucket is in alignment with one of the boxes 64, the stack is forced into the box by means of a loading arm 66. Motion of the bucket conveyor 16 is continuous. The buckets, therefore, move continuously past the loading stations 45 one of which is located at the end of each of the spreading conveyors 12. The stack is transferred to each bucket only if the bucket is empty and if the stack is present at the loading station 45 as will be described fully below.

Transfer of the articles 11 from the conveyor 20 to the loading station 45 will now be described in detail. As seen in FIG. 1, the articles 11 that are to be loaded are present on the belt conveyor 20 in laterally extending columns in longitudinally extending rows, one row being aligned with the inlet end of each of the continuously moving spreading conveyors 26. Conveyor 20 is supported on a framework 24 only a part of which is shown. As the pieces reach the end of the conveyor 20 they pass over a supporting roll 22 for the left end of the conveyor 20. A corresponding roll supporting the right end of the conveyor 20 is not shown. The articles then pass onto one of the spreading conveyors 26 which is itself entrained over a pair of horizontally spaced laterally extending rolls 28 (FIG. 2) supported for rotation upon a framework 27.

Figure 4:
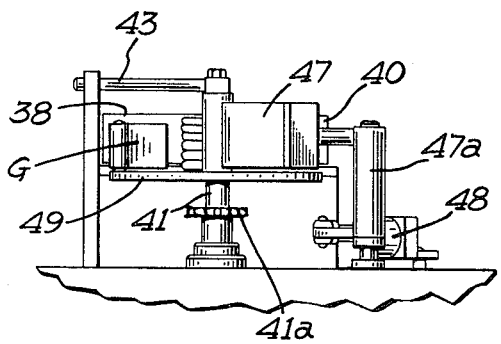
Figure 5:
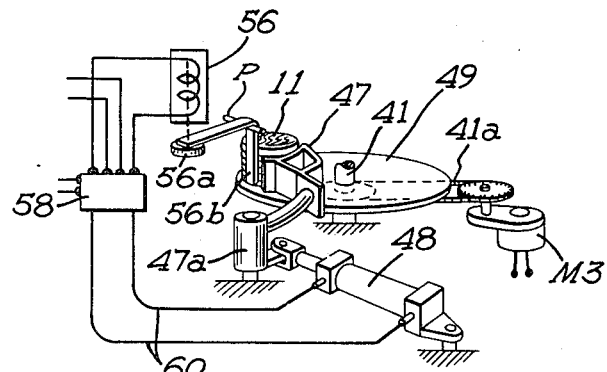
Figure 7:
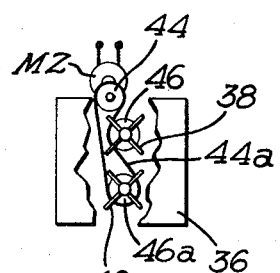

From the outlet end of the conveyor belt 26, the pieces pass onto a relatively short conveyor 30 one end of which is located adjacent conveyor 26 and the other end of which is positioned adjacent the accumulator table 36 as best shown in FIGS. 1 and 3. The conveyors 30 are run somewhat faster than conveyors 26 if it is desired to establish a greater spacing between the articles. Each conveyor 26 is composed of a belt supported by suitable rotatable rolls 32 and 34 (FIG. 2). All of the conveyors 26 and 30 are driven by motor M1 (FIG. 2). From belt 30 the articles fall onto an accumulator table 36 between accumulator emptying star wheels 38 and 40. When a sufficient number of articles 11 are present in the stack on the accumulator table 36, this condition is sensed by photocell and counting means 42b which is illuminated by lamp 42a on the other side of the stack therefrom and is connected to a suitable actuator M2, in this instance a pneumatic actuator, (FIG. 7) which is in turn connected via chain and sprocket assembly 44 including a chain 44a to the sprocket 46 and 46a of the accumulator emptying assembly wheels 38 and 40 respectively. The wheels 38 and 40 are turned a predetermined distance, for example, a quarter of a turn each time the full condition is sensed by the photocell 42b thereby shifting the stack 11 onto a turntable 49 which is supported for rotation on a centrally located vertically disposed support shaft 41 which is coupled to a continuously running drive motor M3 by a chain and sprocket assembly 41a (FIGS. 4 and 5).

The stack is in this way shifted from a stop 43a which is itself supported on a stationary bracket 43 toward a guide G finally to a loading station 45 (FIG. 3) where it remains for a time. When the stack of articles 11 reaches the loading station 45 it is located in alignment with a loading arm 47 supported upon a pivot 47a and coupled at its lower end to an actuator such as a hydraulic actuator 48 that is connected by line 60 to a transducer 58. The transducer 58 receives signals indicating the presence of the stack from a magnetic sensor 56 positioned adjacent to a magnet 56a which is mounted on a sensing arm supported pivotally at P. When the portion 56b of arm 56 is contacted by the articles 11, the magnet 56a moves into proximity with the sensor 56 thereby signaling the transducer 58 that a stack is ready for loading. The stack will not, however, be shifted from the position on the table 49 to one of the buckets 52 until the bucket is located adjacent to the stack as shown in FIG. 3. This condition is determined by a proximity sensor 54 which is also wired to the transducer 58. To determine if each bucket 5 is loaded, a photocell 57 illuminated by the lamp 59 is also wired to the transducer 58. When these three conditions are satisfied, the transducer 58 causes the actuator 48 to be extended by virtue of a pressure differential in lines 60 thereby turning the shift arm 47 in a counterclockwise direction about the pivot 47a as seen in FIGS. 3 and 5 to transfer the stack from the loading station 45 onto the bucket 52 which moves continuously as the stack is transferred.

Figure 6:
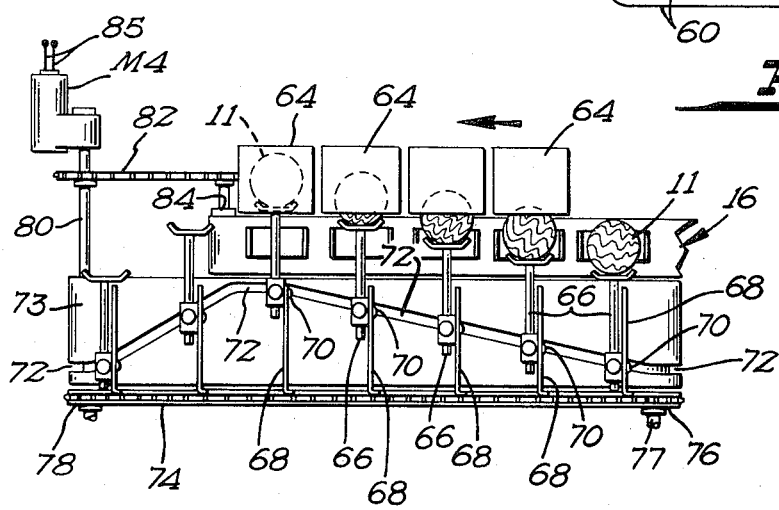

From the conveyor 16, the articles are transferred into open cartons 64 which are themselves supported with their open sides closest to the bucket 52. Each carton is retained on the conveyor 60 by holder 62 (FIG. 1) which contacts the left side thereof as seen in the figure. The conveyor 16, as seen in FIG. 6, is driven by a motor M4 to which power is supplied by conductors 85. A chain and sprocket assembly 82 connect the motor M4 to a drive roll 84 supporting one end of conveyor 16. The other end of conveyor 16 is supported by a similar roll (not shown).

The motor M4 is also connected by a shaft 80 to a drive chain 74 entrained over longitudinally spaced rotatable sprockets 76 and 78 the former being attached to an idler shaft 77 and the latter being secured to the free end of the shaft 80. Secured to the chain 74 at uniformly spaced intervals equal to the spacing between the buckets 52 are a plurality of guides 68 which support loading arms 66 for transverse horizontal shifting movement in the direction of the cartons 64. The arms 66 are moved during operation by cam followers 70 which extend into a cam slot 72 of a horizontally disposed cam plate 73. As seen in FIG. 6, the slot 72 extends from a location spaced somewhat from the conveyor 16 diagonally toward the conveyor 16 thereby shifting the arms 66 and the stack of product 11 engaged by the free ends thereof into a carton 64 as the stacks and cartons 64 travel toward the left in FIG. 6. The arms are withdrawn by a section of the slot 72 inclined in the opposite direction and extending thence beneath the plate 73 whereby the arms are moved from left to right in FIG. 6 until passing around the sprocket 76, they appear again at the right.

It can be seen that the apparatus is capable of transferring a plurality of relatively delicate articles arranged in columns and rows exemplified by the columns and rows of articles traveling out of a conveyorized baking oven to a plurality of stacking locations which accumulate the products and establish the number of products in each package. The apparatus also automatically transfers the stacked products to a holding location and from there delivers them to a bucket conveyor that runs continuously at the same speed as the cartons that are to be loaded. Provision is made for sensing the condition of each bucket and for transferring the articles to a bucket only if empty and only when the bucket is located adjacent to stacked pile in the transfer location. Finally the products are inserted into the packages without damaging the products or disturbing the stack.

What is claimed is:

1. A packaging apparatus comprising in combination, conveyor means for successively feeding a plurality of food articles to an accumulation location where each falls from the conveyor means and lands upon the preceding article in a stacked condition, sensor means adjacent said articles that have landed upon one another to determine when a sufficient number of said articles are present in the stack, said sensor means being operatively connected to an actuator means for transferring the stacked articles to a bucket conveyor having a plurality of buckets thereon for conveying the stack in a given feed direction, means locating a plurality of cartons each adjacent one of the buckets and in alignment therewith and an extensible loading arm means adapted to engage the stack and press the same laterally in a direction normal to the direction of travel and into the carton to thereby fill the carton and further means for withdrawing the loading arm from the carton.

2. An apparatus for stacking and packaging food products comprising a feed conveyor means including an endless conveyor element entrained over horizontally disposed spaced apart rolls for advancing an array of food articles arranged in columns and rows toward the end thereof, a plurality of spreading conveyors being arranged with the ends closest to the feed conveyor being spaced closely together and the opposite ends thereof being spaced further apart in a fan arrangement whereby the articles transferred in the rows and columns on the feed conveyor are advanced upon the spreading conveyors in single diverging rows and a plurality of spaced apart loading assemblies, one assembly being located at the outlet end of each of the spreading conveyors, the spreading conveyors being thereby adapted to feed a plurality of loading assemblies that have a total width which is much greater than the width of the feed conveyor means, each loading assembly including an accumulator means for receiving and retaining a selected number of the articles in stacked arrangement and a transfer means for advancing the stack when the stack is completed to a loading station, a means for transferring each stack at the loading station and means for placing each stack in said station into a carton.

3. Apparatus for stacking and packaging food products comprising in combination conveyor means for carrying a plurality of food articles in sequence to a stacking location defined by a horizontally disposed supporting surface, drive means for running the conveyor continuously to feed the articles in succession to the stationary supporting surface defining an accumulator station whereby each lands upon the one preceding it to form a stack, counting means adjacent to supporting surface to determine when a predetermined number of said articles are present in the stack in the accumulator station and at least one movable accumulator emptying member positioned adjacent the accumulator station in engagement with the stack upon the horizontally disposed surface and operatively associated with the counter for advancing the stack when the stack is completed, a horizontally disposed rotating turntable on a vertically disposed axis adjacent to the accumulator table to receive the stack when the accumulator table emptying member is operated, the rotation of the turntable conveying the stack to a hold location, a transfer arm engagable with the stack in the hold location for transferring the articles off the turntable and loading means operatively associated with the turntable to receive the stack when moved by the pusher arm for loading each stack into a package.

4. Apparatus for stacking and packaging food products comprising in combination conveyor means for carrying a plurality of food articles in sequence to a stacking location defined by a horizontally disposed supporting surface, drive means for running the conveyor continuously to feed the articles in succession to the supporting surface, article counting means adjacent to supporting surface to determine when a predetermined number of said articles are present in the stack in the accumulator station and at least one movable accumulator emptying wheel positioned adjacent the accumulator station in engagement with the stack upon the horizontally disposed surface and operatively associated with the counting means for advancing the stack when the stack is completed, a horizontally disposed rotating turntable on a vertically disposed axis adjacent to the accumulator table to receive the stack when the accumulator table emptying member is operated, the rotation of the turntable conveying the stack to a hold location, a transfer arm engagable with the stack in the hold location for transferring the articles off the turntable and loading means operatively associated with the turntable to receive the stack when moved by the transfer arm for loading each stack into a package, said loading means including an endless conveyor means positioned adjacent the hold location on each turntable, said endless conveyor having a plurality of buckets of an appropriate size to receive one of the stacks, a first sensor means to determine when one of the buckets is in alignment with the stack on the turntable, a second sensor means to determine whether the bucket is empty when aligned with a selected turntable and means operatively associated with both of the sensing means and the transfer arm to actuate the transfer arm and thereby shift the stack from the turntable into the bucket when the bucket is in alignment therewith and is empty, said endless bucket conveyor being adapted to carry the stack to a carton filling station and means operative at the carton filling station for transferring each stack into a package.

5. The packaging apparatus of claim 3 including, a succession of movable buckets, one such bucket to receive each stack, means locating a plurality of cartons adjacent the buckets and in alignment therewith, an extensible loading arm adapted to engage the stack and press the same laterally in a direction normal to the direction of travel and into one of the cartons to thereby fill the carton and further means for withdrawing the loading arm from the carton.

6. The apparatus of claim 3 for stacking and packaging food products including endless feed conveyor entrained over horizontally disposed spaced apart rolls for advancing columns and rows of said food products toward the inlet end of the conveyor means, said conveyor means comprising a plurality of spreading conveyors positioned adjacent the feed conveyor, the spreading conveyors being arranged with the ends closest to the second conveyor being spaced closely together and the opposite ends thereof being fanned apart whereby the articles transferred in the rows and columns on the feed conveyor are advanced by the spreading conveyors in single diverging rows.

* * * * *